United States Patent
Tsirkin

(10) Patent No.: US 11,620,411 B2
(45) Date of Patent: Apr. 4, 2023

(54) ELASTIC LAUNCH FOR TRUSTED EXECUTION ENVIRONMENTS

(71) Applicant: Red Hat, Inc., Raleigh, NC (US)

(72) Inventor: Michael Tsirkin, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 131 days.

(21) Appl. No.: 16/828,229

(22) Filed: Mar. 24, 2020

(65) Prior Publication Data
US 2021/0303734 A1    Sep. 30, 2021

(51) Int. Cl.
| | |
|---|---|
| *G06F 21/71* | (2013.01) |
| *H04L 9/08* | (2006.01) |
| *G06F 9/455* | (2018.01) |
| *H04L 9/32* | (2006.01) |

(52) U.S. Cl.
CPC .......... *G06F 21/71* (2013.01); *G06F 9/45558* (2013.01); *H04L 9/0816* (2013.01); *H04L 9/0894* (2013.01); *H04L 9/3226* (2013.01); *G06F 2009/45587* (2013.01); *G06F 2221/2149* (2013.01)

(58) Field of Classification Search
CPC ... G06F 21/71; G06F 9/45558; H04L 9/0816; H04L 9/0894; H04L 9/3226
USPC .......................................................... 713/190
See application file for complete search history.

(56) References Cited

U.S. PATENT DOCUMENTS

| | | | |
|---|---|---|---|
| 8,954,965 B2 | 2/2015 | Novak et al. | |
| 9,124,563 B2 | 9/2015 | Castillo et al. | |
| 9,246,690 B1 * | 1/2016 | Roth | G06F 21/53 |
| 9,425,965 B2 | 8/2016 | Baumann et al. | |
| 9,607,298 B2 | 3/2017 | Brudnicki et al. | |
| 10,511,598 B2 * | 12/2019 | Shanahan | G06F 12/1408 |
| 2014/0007087 A1 | 1/2014 | Scott-Nash et al. | |
| 2018/0212940 A1 | 7/2018 | Novak | |
| 2019/0042759 A1 | 2/2019 | Smith et al. | |
| 2019/0102555 A1 | 4/2019 | Novak et al. | |
| 2019/0140846 A1 * | 5/2019 | Moore | H04L 9/14 |
| 2019/0155728 A1 | 5/2019 | Ferguson et al. | |
| 2019/0243950 A1 | 8/2019 | Soriente et al. | |

(Continued)

FOREIGN PATENT DOCUMENTS

WO   WO 2019089403 A1   5/2019

OTHER PUBLICATIONS

Robert Buhren, Christian Werling, Jean-Pierre Seifert; "Insecure Until Proven Updated: Analyzing AMD SEV's Remote Attestation"; Technische Universitt Berlin, Security in Telecommunications; Hasso Plattner Institute, Potsdam; Technische Universitt Berlin, Security in Telecommunications | Sep. 2, 2019 | pp. 1-13.

(Continued)

*Primary Examiner* — Kambiz Zand
*Assistant Examiner* — Phuc Pham
(74) *Attorney, Agent, or Firm* — K&L Gates LLP

(57) ABSTRACT

A system includes a memory, a processor in communication with the memory, and a first TEE instance. The first TEE instance is configured to maintain an encrypted secret, obtain a cryptographic measurement associated with a second TEE instance, validate the cryptographic measurement, and provision the second TEE instance with the encrypted secret. Additionally, the first TEE instance and the second TEE instance are both configured to service at least a first type of request.

20 Claims, 6 Drawing Sheets

(56) References Cited

U.S. PATENT DOCUMENTS

2020/0110886 A1* 4/2020 Moyer .................. H04L 9/0861

OTHER PUBLICATIONS

Advanced Micro Devices, Inc.; "Secure Encrypted Virtualization API-Version 0.16" Publication # 55766 | Revision: 3.06 | Feb. 2018 | pp. 1-99.

Joseph I. Choi and Kevin R. B. Butler; "Secure Multiparty Computation and Trusted Hardware: Examining Adoption Challenges and Opportunities"; Department of Computer and Information Science and Engineering, University of Florida, USA | vol. 2019 | Article ID 1368905 | Apr. 2, 2019 | 28 pages.

David Kaplan, Jeremy Powell, Tom Woller; "AMD Memory Encryption"; © 2016 Advanced Micro Devices, Inc.; Apr. 21, 2016; 12 Pages.

Brian McGillion, Tanel Dettenborn, Thomas Nyman, N. Asokan; "Open-TEE—An Open Virtual Trusted Execution Environment" | Intel Collaborative Research Institute for Secure Computing (ICRI-SC) at Aalto University, Finland; Aalto University and University of Helsinki, Finland | Jun. 30, 2015 | 11 Pages.

Jianping Zhu, Rui Hou, XiaoFeng Wang, Wenhao Wang, Jiangfeng Cao, Lutan Zhao, Fengkai Yuan, Peinan Li, Zhongpu Wang, Boyan Zhao, Lixin Zhang, Dan Meng; "Enabling Privacy-Preserving, Compute- and Data-Intensive Computing using Heterogeneous Trusted Execution Environment" | State Key Laboratory of Information Security, Institute of Information Engineering, CAS and University of Chinese Academy of Sciences; Indiana University Bloomington; Institute of Computing Technology, CAS | Accessed on or before Feb. 26, 2020 | 16 Pages.

* cited by examiner

ELASTIC LAUNCH FOR TRUSTED EXECUTION ENVIRONMENTS

BACKGROUND

Trusted execution environments, such as trusted virtual machines may be used to emulate all or a portion of a computer system. The trusted execution environments allow running various software modules, for example, multiple operating systems, concurrently and in isolation from other software modules, on one or more interconnected physical computer systems. Additionally, trusted execution environments may, for example, allow for consolidating multiple physical servers into one physical server running multiple guest virtual machines in order to improve the hardware utilization rate.

Trusted execution environments may include containers, enclaves and virtual machines. Virtualization may be achieved by running a software layer, often referred to as a hypervisor, above the hardware and below the trusted execution environment, such as guest virtual machines or containers. A hypervisor may run directly on the server hardware without an operating system beneath it or as an application running on a traditional operating system. A hypervisor may virtualize the physical layer and provide interfaces between the underlying hardware and trusted execution environments. In some cases, the trusted execution environments may be encrypted for security purposes. Additionally, validation or attestation of launched trusted execution environments may occur for security purposes.

SUMMARY

The present disclosure provides new and innovative systems and methods for elastically launching trusted execution environments, such as a virtual machines ("VMs"), containers and enclaves. In an example, a system includes a memory, a processor in communication with the memory, and a first trusted execution environment ("TEE") instance. The first TEE instance is configured to maintain an encrypted secret, obtain a cryptographic measurement associated with a second TEE instance, validate the cryptographic measurement, and provision the second TEE instance with the encrypted secret. Additionally, the first TEE instance and the second TEE instance are both configured to service at least a first type of request.

In an example, a method includes maintaining, by a first TEE instance, an encrypted secret. The first TEE instance obtains a cryptographic measurement associated with a second TEE instance, validates the cryptographic measurement, and provisions the second TEE instance with the encrypted secret. The first TEE instance and the second TEE instance are configured to service at least a first type of request.

In an example, a non-transitory machine-readable medium stores code, which when executed by a processor is configured to maintain an encrypted secret in a memory associated with a first TEE instance, obtain a cryptographic measurement associated with a second TEE instance, validate the cryptographic measurement, and provision the second TEE instance with the encrypted secret. The first TEE instance and the second TEE instance are configured to service at least a first type of request.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1:
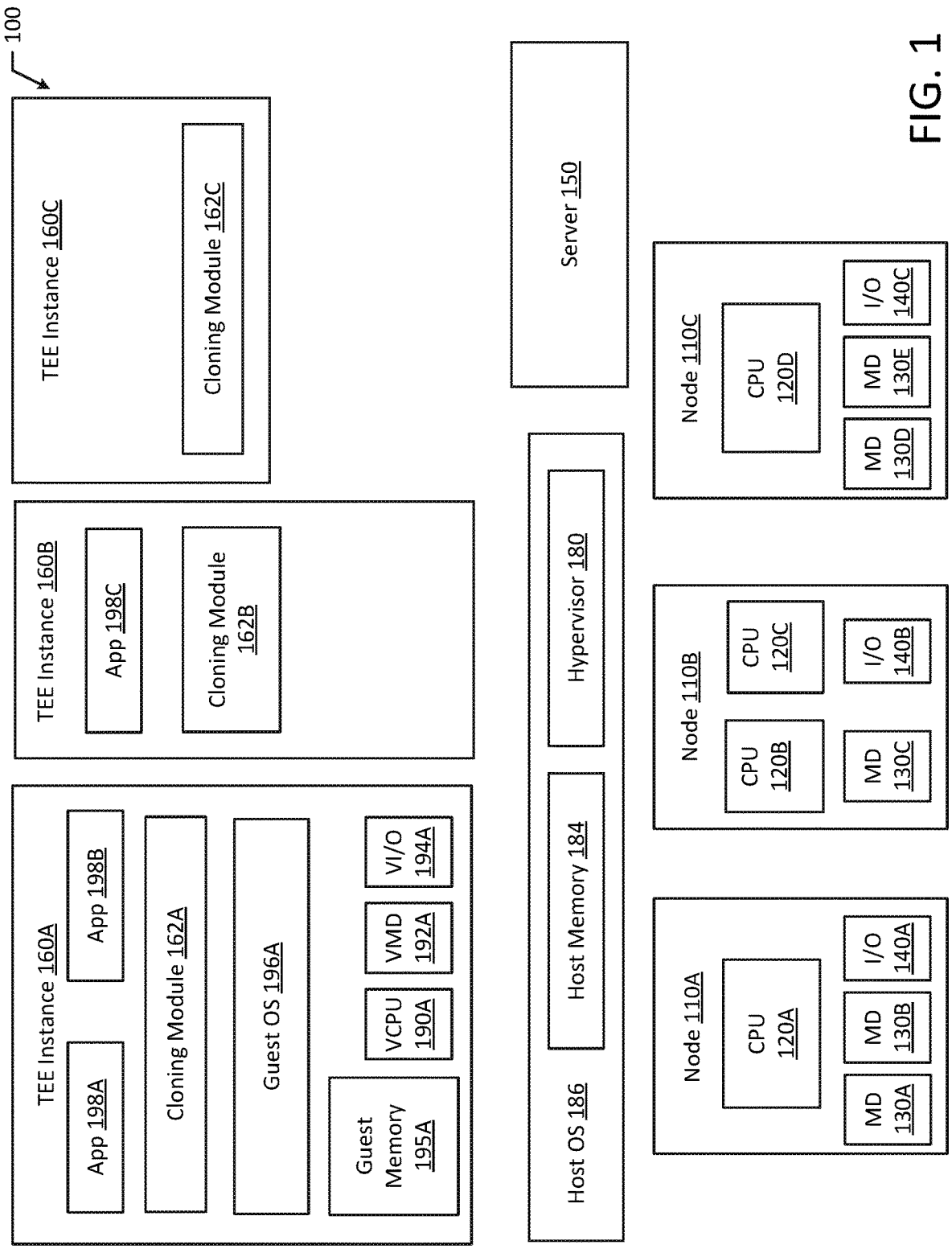
FIG. 1 illustrates a block diagram of an example computer system according to an example embodiment of the present disclosure.

Techniques are disclosed for providing "elastic" launching for trusted execution environments, such as a virtual machines ("VMs"), containers and enclaves. Modern hardware supports trusted execution environment (TEE) techniques where a supervisor of a host computer does not have access to memory of a specific TEE, such as a trusted container, a trusted virtual machine, or a trusted software enclave running on the host computer. For example, the supervisor may lack access to the memory of the TEE because the memory is protected by host hardware or host firmware. Memory encryption is one such technique to protect the memory of the TEE. In an example, encrypted memory may be used to support and protect running sensitive workloads in the cloud.

Launching a TEE instance, such as a trusted container, by a cloud provider typically involves using a secret that is private to the TEE instance owner and unavailable to the cloud provider. For example, a disk image of the TEE instance (e.g., disk image of the trusted container) may be encrypted with a secret key. However, providing this secret to the TEE instance (e.g., trusted container) presents a challenge. One way to provide the secret to the TEE instance is by having the host hardware or the host firmware first provide a measurement (e.g., cryptographic measurement) of the TEE instance owner. The measurement (e.g., cryptographic measurement) may be used for attestation or validation to ensure that the TEE instance runs under a trusted environment and is protected from the supervisor or hypervisor. After verifying that the TEE instance runs under a trusted environment and is protected from the supervisor or hypervisor, the TEE instance owner's secret is encrypted and forwarded to the TEE instance. For example, the secret may be provided to a trusted container in an encrypted form and in a container specific way.

However, providing the secret to the TEE instance in this way typically requires the TEE instance owner to maintain a service (e.g., attestation service) for verifying the measurement and providing the encrypted secret. Additionally, the service (e.g., attestation service) is typically required to be accessible to the cloud provider, but outside of the cloud provider's control. In an example, the service is envisioned to be hosted on the TEE instance owner's private cloud. However, hosting the service on the TEE instance owner's private cloud is inappropriate for "elastic" workloads that launch and shut down TEE instances (e.g., trusted containers) at a high rate. For example, should the private cloud become unavailable, the ability to launch new TEE instances would become unavailable. Additionally, if the private cloud slows down and is unable to serve requests, the ability to launch new TEE instances would be halted and unavailable until the private cloud is again able to serve requests.

Providing attestation services through a private cloud often requires that the TEE instances are not treated as "cattle" where they are started up and shut down at will. Instead, the TEE instances are treated as "pets" and carefully migrated live without shutting down. However, live migration increases costs for the cloud providers and the TEE instance owners. For example, treating the TEE instances as "pets" that are migrated live increases hardware utilization and creates additional overhead (e.g., due to successive iterations of memory pre-copying that consumes extra CPU cycles on both source and destination servers).

Another technique for providing attestation services to TEEs is to use a quoting TEE instance (e.g., quoting enclave) that runs on the same platform as the TEE instances (e.g., enclaves) being attested. The quoting enclave provides attestation services to the application enclaves by signing their attestation reports. For example, the quoting enclave may verify attestation reports for the platform and the quoting enclave may hold the platforms attestation key. In an example, multiple attesting enclaves may create respective attestation reports for the quoting enclave and the quoting enclave verifies the report and signs the report with the attestation key. Then, off-platform tenants may go through a verification process to obtain the attestation information. For example, the verification of a quote by an off-platform tenant involves verifying that a Provisioning Certification Key ("PCK") embedded in the quote is valid. For example, verification of the quote may be achieved by using the PCK certificate chain obtained from a manufacturer associated with the enclave (e.g., Intel as a SQX processor that utilizes quoting enclaves). Additionally, verifying the quote also includes verifying that the key associated with the PCK certification is the one that signed the platform's attestation key (e.g., signed the hash of the platform's attestation key). Verification of the quote also includes verifying that the attestation key was the one that signed the quote and also verifying that the hash of the attestation key embedded in the quote is correct.

To eliminate the need of live migration, to reduce the reliance on private cloud attestation services, to eliminate the numerous verification steps associated with quoting enclaves, and to improve the latency of launching TEE instances (e.g., containers, virtual machines or enclaves), each TEE instance that is launched may maintain the secret instead of discarding the secret after launching. For example, the TEE instance may maintain the secret in the TEE instances encrypted memory. Additionally, each TEE instance may include a "cloning" service that serves as a secret provisioning service. For example, the "cloning" service may be part of the TEE itself.

In an example, a TEE instance, a VM, a container or an enclave may include a service listening on a specific port receiving a measurement (e.g., cryptographic measurement). The service may validate the measurement and provision the "cloned" TEE instance with the encrypted secret.

For example, to launch a new instance of the TEE, an application running in the cloud, which may be represented by various TEE instances, may launch a new TEE instance and may connect to an already running TEE instance. The already running TEE instance obtains a measurement (e.g., cryptographic measurement) from the newly launched TEE instance. After validating the measurement, the already running TEE instance may pass the secret to the newly created TEE instance (e.g., the "clone"). After validating and passing the secret to the newly created TEE instance, the already running TEE instance may revert back to running its original workload. For example, the already running TEE instance may serve application requests when it is not performing validation services.

Thus, applications can scale "elastically" as long as a single instance of the application keeps running. The quantity of instances can scale from one to a large quantity (e.g., unlimited) without having to contact any external validation or attestation services. For example, any of the running TEE instances can validate newly launched TEE instances and provide secrets or keys to these newly launched TEE instances without having to rely on external attestation services on external networks (e.g., private clouds). For example, a third party validation or attestation service, such as those hosted on a private cloud, may go off-line or slow down thereby causing an interruption to completing start-up of TEE instances after launch. If the private cloud goes off-line for an extended period of time, the TEE instances may be entirely prevented from starting-up and serving application requests, causing delays or even a crash of the application on the cloud.

Furthermore, the ability to use or re-use TEE instances that are currently running for validation (e.g., attestation) allows for low latency, high availability, and "elastic" scaling without reducing security. Additionally, the systems and methods described herein do not require any special machinery for the TEE instances with validation or cloning capabilities because the TEE instance is a trusted TEE instance, like any other trusted TEE instance, and is treated as such.

FIG. 1 depicts a high-level component diagram of an example computing system 100 in accordance with one or more aspects of the present disclosure. The computing system 100 may include an operating system (e.g., host OS 186), one or more TEEs (e.g., TEE instances 160A-C), a cloud provider (e.g., server 150), and nodes (e.g., nodes 110A-C).

A TEE instance (e.g., TEE instance 160A) may be a virtual machine, container, enclave, etc. and may include a cloning module (e.g., cloning module 162A). Each TEE instance 160A-C may include a respective cloning module 162A-C. The TEE instance may also include a guest OS, guest memory, a virtual CPU (VCPU), virtual memory devices (VIVID), and virtual input/output devices (WO). For example, TEE instance 160A may include guest OS 196A, guest memory 195A, a virtual CPU 190A, a virtual memory devices 192A, and virtual input/output device 194A. Virtual machine memory 195A may include one or more memory pages. Similarly, TEE instance 160B may include a guest OS, guest memory, a virtual CPU, virtual memory devices, and virtual input/output devices.

The computing system 100 may also include a supervisor or hypervisor 180 and host memory 184. The supervisor or hypervisor 180 may manage host memory 184 for the host operating system 186 as well as memory allocated to the TEEs (e.g., TEE instances 160A-C) and guest operating systems (e.g., guest OS196A such as guest memory 195A provided to guest OS 196A. Host memory 184 and guest memory 195A may be divided into a plurality of memory pages that are managed by the supervisor or hypervisor 180. Guest memory 195A allocated to the guest OS 196A may be mapped from host memory 184 such that when an application 198A-D uses or accesses a memory page of guest memory 195A, the guest application 198A-D is actually using or accessing host memory 184.

In an example, a TEE instance (e.g., TEE instance 160A-C), such as a virtual machine, container or enclave may execute a guest operating system 196A and run applications 198A-B which may utilize the underlying VCPU 190A, VIVID 192A, and VI/O device 194A. One or more applications 198A-B may be running on a TEE, such as virtual machine, under the respective guest operating system 196A. TEEs (e.g., TEE instances 160A-C) may run on any type of dependent, independent, compatible, and/or incompatible applications on the underlying hardware and OS. In an example, applications (e.g., App 198A-B) run on a TEE, such as a virtual machine, and may be dependent on the underlying hardware and/or OS 186. In another example, applications 198A-B run on a TEE, such as a virtual machine, and may be independent of the underlying hardware and/or OS 186. For example, applications 198A-B running on a first TEE instance 160A may be dependent on the underlying hardware and/or OS 186 while applications (e.g., application 198C) running on a second TEE instance 160B are independent of the underlying hardware and/or OS 186A. Additionally, applications 198A-B running on TEE instance 160A may be compatible with the underlying hardware and/or OS 186. In an example, applications 198A-B running on a TEE instance 160A may be incompatible with the underlying hardware and/or OS 186.

The cloud provider (e.g., server 150) may host the TEE instances 160A-C alongside each other. For example, the server 150 may receive a request to start an application, which may include one or more TEE instances 160A-C. The server 150 may include hardware, such as processor(s), memory, hard drives, network adapters for network connection, etc. For example, server 150 may include many of the same hardware components as nodes 110A-C.

The TEE instances 160A-C may serve application requests. However, upon request, the TEE instances 160A-C may stop serving application requests and instead validate another new TEE instance (e.g., TEE instance 160A may validate TEE instance 160C) such that the new TEE instance (e.g., TEE instance 160C) can complete start-up. For example, the TEE instances 160A-B may provide the newly started TEE instance 160C with a secret, key or key-secret pair. The TEE instances 1602A-B may be used to clone and validate TEE instances 160C without the cloned TEE instances 160C having to communicate with a third-party or external attestation service (e.g., attestation service hosted on a private cloud).

The system advantageously provides additional flexibility while launching TEE instance(s), allows for "elastic" scaling, and simplifies cloud management while maintaining security. For example, the systems and methods described herein do not rely on the platform to provide security, which is typically required when using quoting enclaves. Furthermore, using a quoting enclave requires contacting the tenant to perform the validation, which as described above, may pose a problem if the tenant is unable to be reached (e.g., tenant's attestation services going off-line or slowing down). As long as a single TEE instance is running, the systems and methods described herein allow for "elastic" scaling from one TEE instance to a plurality of TEE instances based on the present load or network demand and without contacting any external validation or attestation services.

The computer system 100 may include one or more nodes 110A-C. Each node 110A-C may in turn include one or more physical processors (e.g., CPU 120A-D) communicatively coupled to memory devices (e.g., MD 130A-D) and input/output devices (e.g., I/O 140A-C). Each node 110A-C may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. TEE instances 160A-C may be provisioned on the same host or node (e.g., node 110A) or different nodes. For example, TEE instance 160A and TEE instance 160B may both be provisioned on node 110A. Alternatively, TEE instance 160A may be provided on node 110A while TEE instance 160B is provisioned on node 110B.

As used herein, physical processor, processor or CPU 120A-D, refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-D refers to a volatile or non-volatile memory device, such as RAM, ROM, EEPROM, or any other device capable of storing data. As discussed herein, I/O device 140A-C refers to a device capable of providing an interface between one or more processor pins and an external device capable of inputting and/or outputting binary data.

Processors (e.g., CPUs 120A-D) may be interconnected using a variety of techniques, ranging from a point-to-point processor interconnect, to a system area network, such as an Ethernet-based network. Local connections within each node, including the connections between a processor (e.g., CPU 120A-D) and a memory device 130A-D may be provided by one or more local buses of suitable architecture, for example, peripheral component interconnect (PCI).

Figure 2:
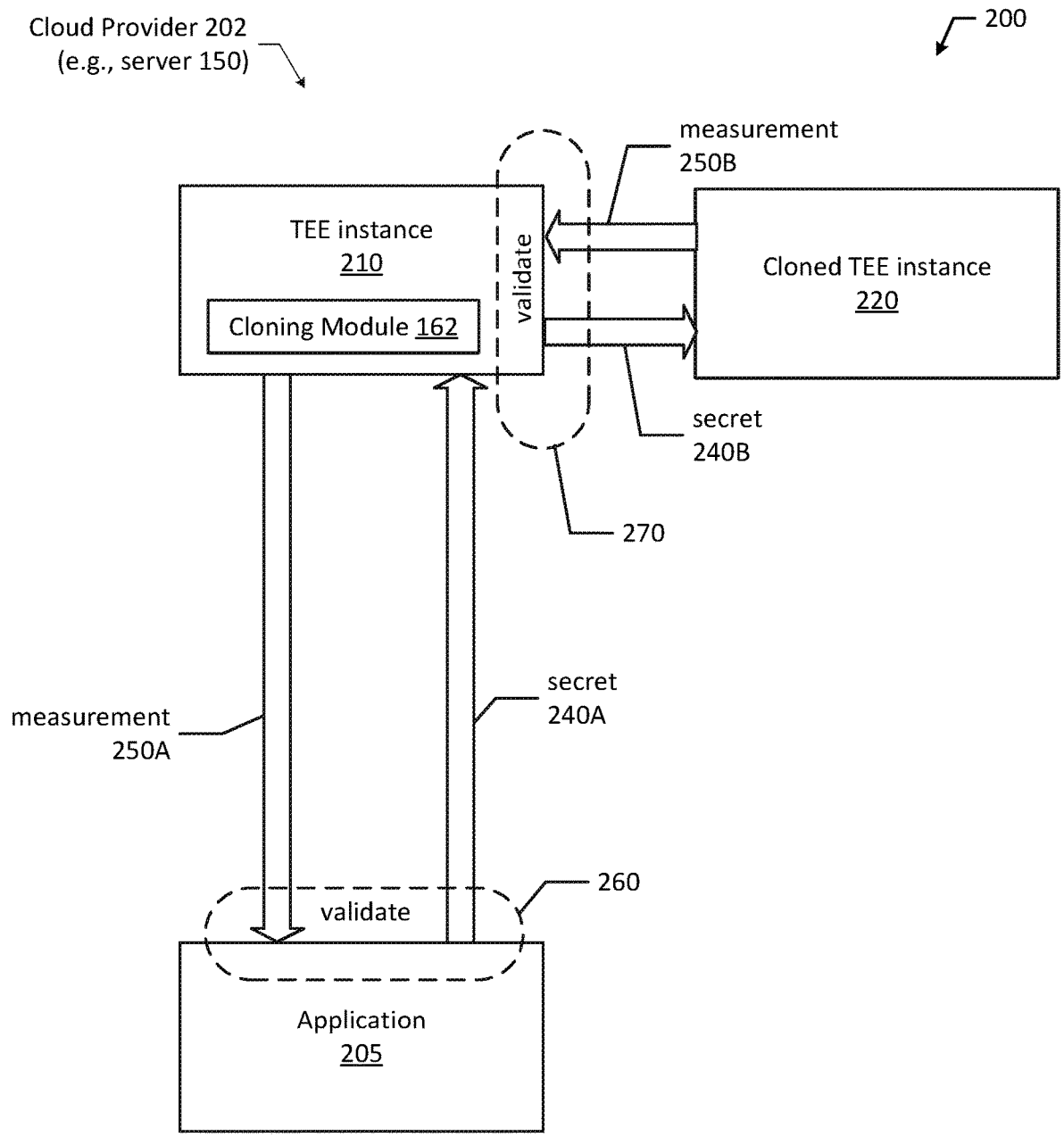
FIG. 2 illustrates a block diagram of an example elastic launch system for TEE instances according to an example embodiment of the present disclosure.

FIG. 2 illustrates a block diagram of an elastic launch system 200 for launching or cloning TEE instances. As illustrated in FIG. 2, an application 205 running in a cloud may initially create a TEE instance 210. When creating TEE instance 210, the application 205 may provide the TEE instance with a secret 240A after validating the TEE instance 210 through validation process 260. For example, application 205 may provision the TEE instance 210 with secret 240A after obtaining and validating a measurement 250A (e.g., a cryptographic measurement). In another example, the cloud provider 202, such as server 150, may launch the TEE instance 210.

In an example, an application 205 may include multiple TEE instances. Each TEE instance may perform a different function or provide a different service for the application 205. For example, an application 205 may consist of a number of trusted application containers. Upon requesting to start or clone a new application instance (e.g., TEE instance 210), the newly launched application instance (e.g., cloned TEE instance 220) may connect to an already running TEE instance 210. Similarly, if cloning a new application 205 that includes multiple TEE instances or trusted application containers (e.g., four trusted application containers), each of the four trusted application containers may be cloned to clone the application 205.

After the TEE instance 210 is provisioned with the secret 240A, the TEE instance 210 maintains the secret 240A instead of discarding the secret 240A after launch. Then, to validate a newly launched TEE instance (e.g., cloned TEE instance 220), the cloned TEE instance 220 may connect to the TEE instance 210. Then, the TEE instance 210 may obtain a cryptographic measurement 250B associated with the cloned TEE instance 220. Based on the cryptographic measurement 250B, the TEE instance 210 with cloning module 162 may validate the clone TEE instance 280 through validation process 270. Integrating the cloning module 162 as part of a TEE instance 210 advantageously enables "elastic" scaling of applications to be performed transparently with minimal changes to the applications 205 or cloud providers 202.

For example, the TEE instance 210 may validate cloned TEE instance 220 by comparing the cryptographic measurement 250B to a reference measurement, an integrity record, an attestation record, etc. After validation, the TEE instance 210 may provide the secret 240B to the cloned TEE instance 220. As illustrated in FIG. 2, the secret 240B provided to the cloned TEE instance 220 is the secret 240A that was provided to and maintained by TEE instance 210. Once the TEE instance 210 provides the key or secret 240B to the cloned TEE instance 220, the cloned TEE instance 220 can finish launching. The cloned TEE instance 220 may include its own cloning module 162 such that the cloned TEE instance 220 may also launch and clone additional TEE instances.

Measurements 250A-B described above may be cryptographic measurements that identify characteristics of the TEE instance(s) 210 such as the type of TEE instance 210, version of the TEE instance 210, description of software components loaded into the TEE instance 210, etc. Additional examples of cryptographic measurements are described in more detail below.

Figure 3:
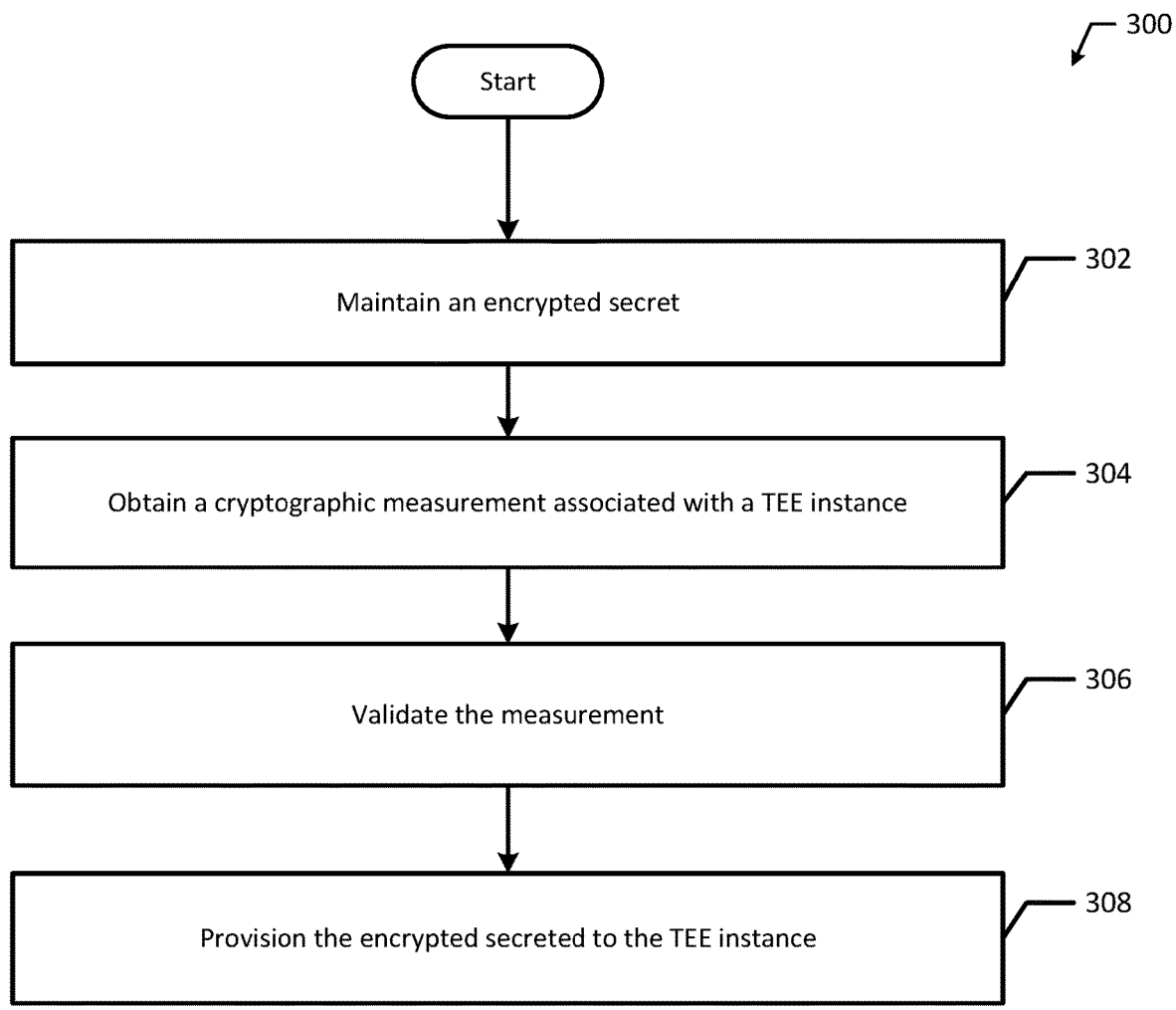
FIG. 3 illustrates a flowchart of an example process for elastically launching TEE instances according to an example embodiment of the present disclosure.

FIG. 3 illustrates a flowchart of an example method 300 for elastically launching TEE instances in accordance with an example of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, blocks may be repeated, and some of the blocks described are optional. The method 300 may be performed by processing logic that may comprise hardware (circuitry, dedicated logic, etc.), software, or a combination of both.

In the illustrated example, method 300 includes maintaining an encrypted secret (block 302). For example, a TEE instance 210 may maintain an encrypted secret 240A, hereinafter referred to generally as encrypted secret 240. It should be appreciated that TEE instance 210 of FIG. 2 may represent one of the TEE instance(s) 160A-C of FIG. 1, which may each be referred to generally as TEE instance 210. Method 300 also includes obtaining a cryptographic measurement associated with a TEE instance (block 304). For example, the TEE 210 may obtain a cryptographic measurement associated with another TEE instance (e.g., cloned TEE instance 220). The cryptographic measurement 250B, hereinafter referred to generally as measurement 250, may include measurements of files, BIOS, bootloaders, virtual memory, components, images, internal configurations, current software or applications run by the TEE, etc. Components of the boot of the cloned TEE instance 220 may be cryptographically measured (e.g., each boot component may be measured either individually or collectively by computing the hash values of byte arrays representing the boot components).

It should be appreciated that cloned TEE instance 220 of FIG. 2 may represent one of the TEE instance(s) 160A-C of FIG. 1, which may each be referred to generally as cloned TEE instance 220. The TEE instance 210 may be capable of serving application requests while acting as a TEE instance 210 and may stop to instead validate or clone other TEE instances 220. For example, the TEE instance 210 may include a cloning module 162, which may be configured to obtain cryptographic measurements, validate the cryptographic measurements, and provision newly launched TEE instances 220 with a key or secret upon validation.

Then, method 300 includes validating the cryptographic measurement (block 306). For example, the TEE instance 210 may validate the cryptographic measurement 250. The cryptographic measurement 250, such as measured values of the boot components, may then be used to decide if the cloned TEE instance 220 can be trusted. Additionally, the cryptographic measurement 250 or hash may represent a fingerprint of the measured files.

In another example, the cryptographic measurement 250 may include a measurement value that is a hash value of the files associated with the cloned TEE instance 220. In another example, a cryptographic measurement 250 may be taken from one or more of the cloned TEE instance 220 images. The measurement 250 may be compared to integrity records or attestation records from a reference measurement. In some cases, the measurement 250 may also indicate the origin of the measured information, which may help attest that the origin of the information is a trusted source.

Method 300 also includes provisioning the encrypted secret to the TEE instance (block 308). For example, the TEE instance 210 may provision the other TEE instance (e.g., cloned TEE instance 220) with the encrypted secret 240. The secret 240 or key may involve symmetric encryption or asymmetric encryption. Symmetric encryption is an encryption process that uses a single key for both encryption and decryption. In symmetric encryption, the same secret 240 or key is available to multiple entities (e.g., TEE instances 210 and cloned TEE instances 220). Asymmetric encryption uses key pairs or key-secret pairs that may each include a private key and a public key. In an example, the private key is known only to a respective entity (e.g., TEE instance 210), and the public key is known to a group of entities in the network (e.g., each TEE instance 210 and cloned TEE instance 220). A cloned TEE instance 220 may use the public key to encrypt data, and the encrypted data can be decrypted using the private key or encrypted secret 240 provided by TEE instance 210.

The encryption and decryption may utilizing hashing functions such as the Secure Hash Algorithm ("SHA") (e.g., SHA-128, SHA-256, etc.) or other hashing functions such as MD5. For example, the encrypted secret 240 or key may appear to be a random string of numbers and letters (e.g., 140FA9Z425ED694R018019B492). Additionally, the encryption and decryption processes may be performed according to the Advanced Encryption Standard ("AES"). AES is based on a design principle known as a substitution-permutation network, and may utilize keys with a key size of 128, 192, or 256 bits.

Figure 4A:
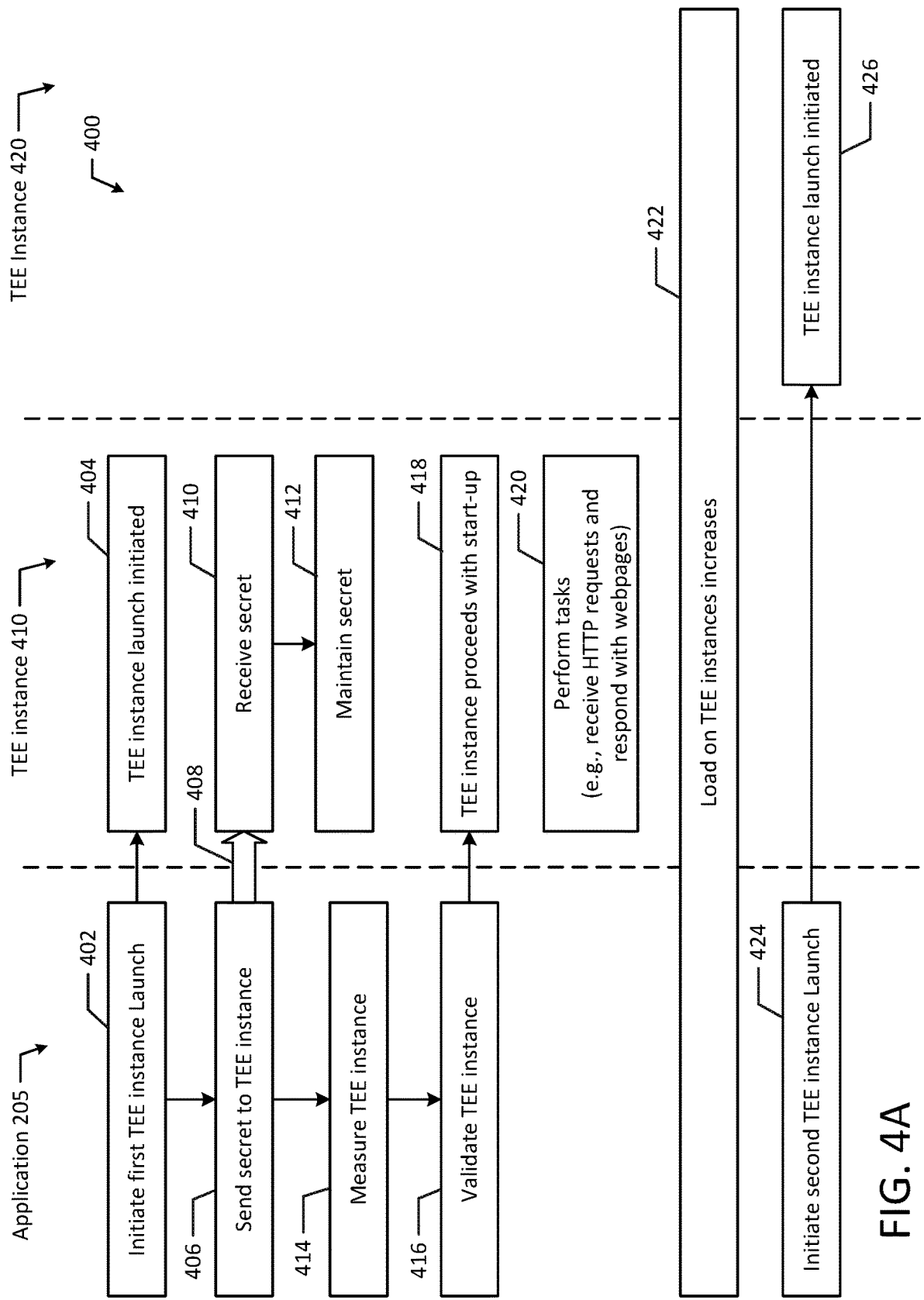
FIGS. 4A and 4B illustrate a flow diagram of an example process for elastically launching TEE instances according to an example embodiment of the present disclosure.
Figure 4B:
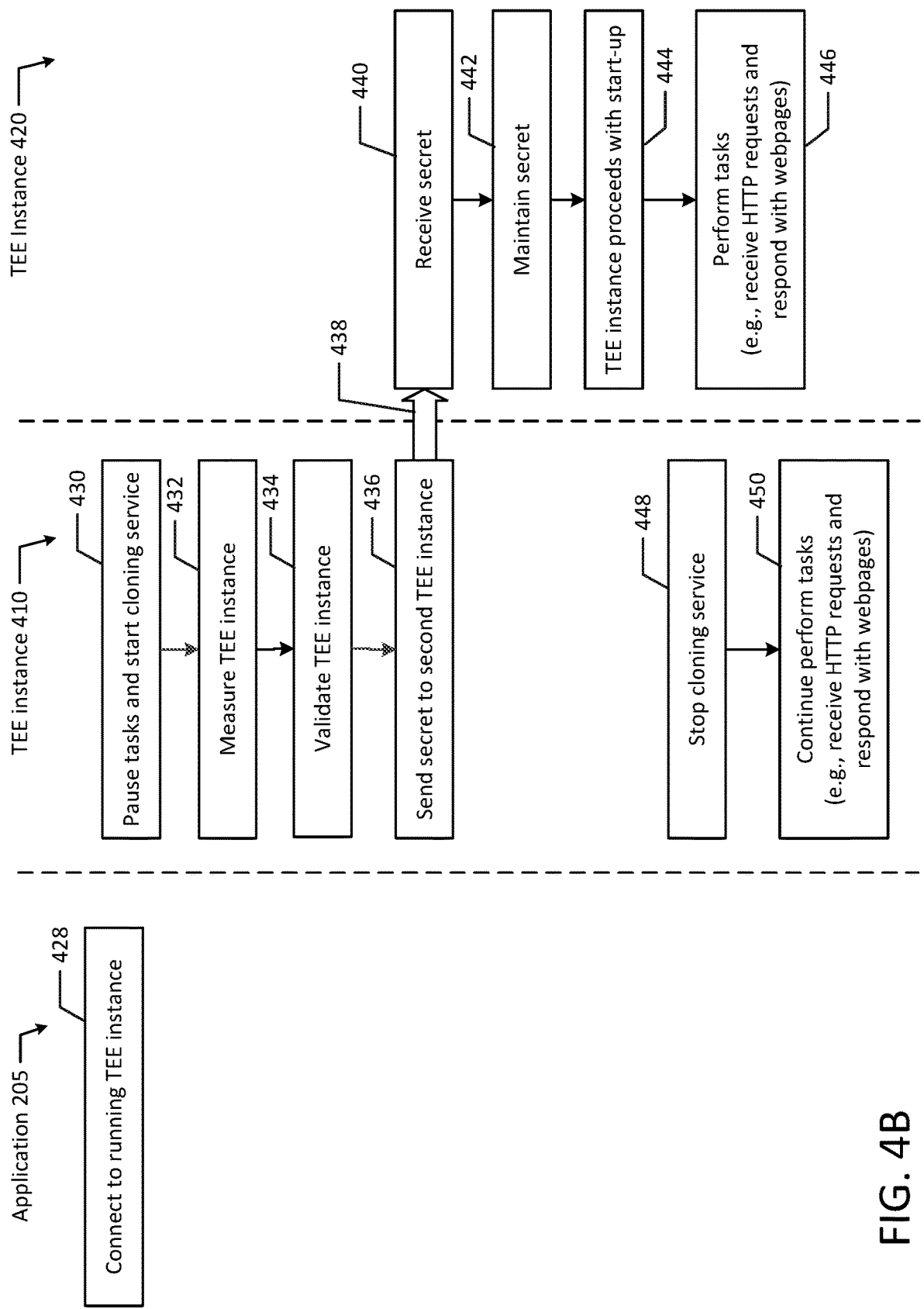

FIGS. 4A and 4B depicts a flow diagram illustrating an example method 400 for elastically launching TEE instances according to an example embodiment of the present disclosure. Although the example method 400 is described with reference to the flow diagram illustrated in FIGS. 4A and 4B, it will be appreciated that many other methods of performing the acts associated with the method may be used. For example, the order of some of the blocks may be changed, certain blocks may be combined with other blocks, blocks may be repeated, and some of the blocks described are optional. The method may be performed by processing logic that may comprise (e.g., circuitry, dedicated logic, etc.), software, or a combination of both. For example, application 205, TEE instance 410, and TEE instance 420 may communicate to perform example method 400.

In the illustrated example, an application 205 may initiate launching a first TEE instance 410 (block 402). The initial launch of TEE instance 410 may be due to a new version launch, a migration of the application 205 to another cloud provider, or to increase the amount of network traffic the application 205 can handle. Then, the TEE instance 410 is launched (block 404). Even though the TEE instance 410 is launched and running, the TEE instance 410 has not yet been validated and therefore is not allowed to proceed with start-up. After launching the TEE instance 410, the application 205 may send a secret 408 to the TEE instance 410 (block 406). The secret 408 may be a key and may be encrypted. For example, secret 408 may be maintained in encrypted memory. Then, the TEE instance 410 receives the secret 408 (block 410). In an example, the secret 408 or key may be initially be provided by the application 205 or a third-party attestation service. Alternatively, the secret 408 or key may also be retrieved by the TEE instance 410. In another example, the TEE instance 410 may be launched and provisioned with the secret 408 or key. For example, the secret 408 or key may be on the TEE disk image. Additionally, the TEE instance 410 maintains the secret 408 (block 412). For example, the TEE instance may maintain the secret 408 (e.g., encrypted secret) in encrypted memory.

The application 205 may also measure the TEE instance 410 (block 414). For example, the application 205 may cryptographically measure the TEE instance 410. The cryptographic measurement may include measurements of files, BIOS, bootloaders, virtual memory, components, images, internal configurations, current software or applications run by the TEE instance, etc. Additionally, the application may validate the TEE instance (block 416). Validation or attestation may be required to ensure that the TEE instance 410 is authorized for deployment. Validation may provide an endorsement that the TEE instance 410 was launched by a trusted platform and that the TEE instance's code is endorsed by a trusted entity. Allowing a TEE instance 410 to proceed with start-up without validating or attesting the TEE instance 410 may allow untrusted applications (e.g., malicious applications) to start-up and cause security breaches.

For example, after validating the TEE instance 410, the TEE instance may complete start-up (block 418). As mentioned above, even though TEE instance 410 has launched, start-up is not completed until validation occurs. Without completing start-up, the TEE instance 410 is unable to serve application requests and perform runtime services. Then, the TEE instance 410 may start performing tasks (block 420). For example, the TEE instance 410 may start performing runtime services on the cloud, such as receiving HTTP requests and responding with webpages.

In the illustrated example, the load on the TEE instances (e.g., TEE instance 410) increases (block 422). For example, the network traffic may have increased. Based on the increased network traffic or application usage, the application 205 may initiate launching a second TEE instance 420 (block 424). For example, an application may send a request to start or clone another TEE instance (e.g., TEE instance 420) due to increased traffic that requires additional TEE instances to handle the load. In other examples, the request to start additional TEE instances (e.g., TEE instance 420) may be to launch a new version or new release of the application 205 in the cloud.

Then, the TEE instance 420 is launched (block 426). Similar to when TEE instance 410 was launched, even though the TEE instance 420 is launched and running, the TEE instance 420 has not yet been validated and therefore is not allowed to proceed with start-up. Continuing on FIG. 4B, after the TEE instance 420 is launched, the application 205 may connect the running TEE instance 410 to the newly launched TEE instance 420 (block 428). Once connected, the TEE instance 410 pauses tasks and starts a cloning service (block 430). The TEE instance 410 measures the newly launched TEE instance 420 (block 432). For example, the TEE instance 410 may include a cloning module 162 configured to cryptographically measure the newly launched TEE instance 420. The cryptographic measurement may be the same type of measurement performed when validating TEE instance 210. In an example, the cryptographic measurement may identify characteristics of the TEE instance 420 including at least one of a type of the TEE instance, a version of the TEE instance, and a description of software components loaded into the TEE instance.

Based on the measurement, the TEE instance 410 validates the newly launched TEE instance 420 (block 434). Validation or attestation may occur if the cryptographic measurement matches a reference measurement. For example, if the cryptographic measurement produces a measurement value (e.g., hash value) that matches a trusted reference measurement, the TEE instance 410 may determine that the newly launched TEE instance 420 (e.g., cloned TEE instance) is trustworthy. When validated, the TEE instance 410 sends a secret 438 to the TEE instance 420 (block 436). Secret 438 is the same as or a copy of secret 408 that TEE instance 410 was provisioned with. The secret 438 or key may involve symmetric encryption or asymmetric encryption. With asymmetric encryption, the secret 438 or key may use key pairs or key-secret pairs. In an example, the encryption and decryption may utilizing hashing functions such as the Secure Hash Algorithm ("SHA") (e.g., SHA-128, SHA-256) or MD5. Additionally, the encryption and decryption processes may be performed according to the Advanced Encryption Standard ("AES") and may utilize keys or secrets 438 with a size of 128, 192, or 256 bits.

Then, the TEE instance 420 receives the secret 438 (block 440). In the illustrated example, the TEE instance 420 maintains the secret 438 (block 442). By maintaining the secret 438 instead of discarding it, the newly launched TEE instance 420 may also be used to validate additional TEE instances in the future. For example, the TEE instance 420 may maintain the encrypted secret 438 in encrypted memory.

After receiving the secret 438 or key, the TEE instance proceeds with start-up (block 444). Then, the TEE instance 420 may start performing tasks (block 446). For example, the TEE instance 420 may start performing runtime services on the cloud, such as receiving HTTP requests and responding with webpages to help handle the increased load.

Additionally, the TEE instance 410 may stop its cloning service (block 448) and continue performing task and serving application requests (block 450). For example, after successfully validating the newly launched TEE instance 420, the TEE instance 410 may continue to perform tasks (e.g., receive HTTP requests and respond with webpages) as before to handle the network traffic. If network traffic increases again and additional TEE instances (e.g., TEE instances 410, 420) need to be cloned, either of the now running TEE instances 410, 420 may validate additional TEE instances that are launched on the cloud, which advantageously allows the application 205 to scale "elastically." As long as a single TEE instance 410, 420 is running, the method 400 allows for "elastic" scaling from one TEE instance (e.g., TEE instance 410) to a plurality of TEE instances (e.g., TEE instances 410, 420) based on the present load or network demand and without contacting any external validation or attestation services. Thus, the method 400 provides high and "elastic" availability to attestation or validation services without reducing security.

Additionally, method 400 is capable providing validation (e.g., cloning services) for newly launched TEE instances 420 via other TEE instances 410 hosted by the same cloud provider 202. Validating newly launched TEE instances 420 with TEE instances 410 that are already running and hosted by the same cloud provider 202 eliminates the added risk associated with relying on a private cloud for attestation services. For example, validation or attestation services provided by a third party or a private cloud adds another point of failure (e.g., the private cloud going off-line or slowing down). If the private cloud goes off-line, all attestation services may stop completely. Conversely, multiple TEE instances 410, 420 may be launched and running at the same time such that if one of the TEE instances (e.g., TEE instance 420) crashes or goes off-line, another TEE instance (e.g., TEE instance 410) may assume the responsibility of validating (e.g., attesting) newly launched TEE instances.

Figure 5:
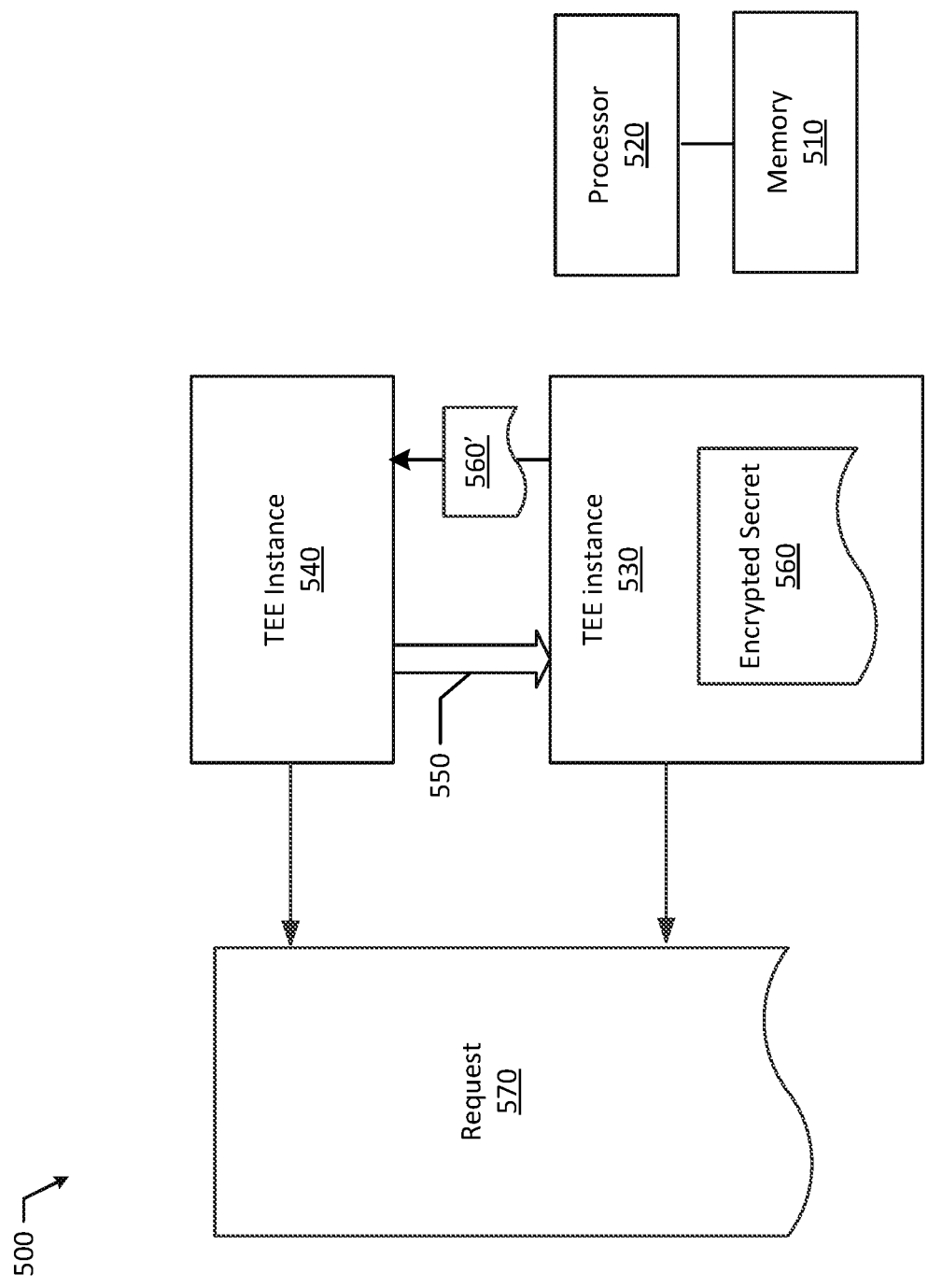
FIG. 5 illustrates a block diagram of an example elastic launching or cloning system according to an example embodiment of the present disclosure.

FIG. 5 is a block diagram of an example elastic launching or cloning system 500 according to an example embodiment of the present disclosure. The system 500 includes a memory 510, a processor 520 in communication with the memory 510, and a TEE instance 530. The TEE instance 530 is configured to maintain an encrypted secret 560 and obtain a cryptographic measurement 550 associated with another TEE instance 540. The TEE instance 530 is also configured to validate the cryptographic measurement 550 (e.g., thereby validating the TEE instance 540) and provision the TEE instance 540 with the encrypted secret 560'. Additionally, the TEE instance 530 and the TEE instance 540 are both configured to service at least a first type of request 570. For example, both the TEE instance 530 and the TEE instance 540 may both serve application requests such as responding with webpages after receiving HTTP request. Specifically, the TEE instance 540 may be a clone of the TEE instance 530 both of which are configured to serve application requests. However, to provide "elastic" scaling, a running TEE instance (e.g., TEE instance 530) may also provide validation services or cloning services, which allows an application to scale and launch additional TEE instances (e.g., TEE instance 540) to meet increased network demand. In an example, the already running TEE instance 530 may serve application requests when it is not performing validation services.

Therefore, system 500 provides "elastic" launching and scaling capabilities compared to systems that solely rely on third-part attestation services maintained on external networks, such as a private cloud. For example, when a private cloud's attestation services go off-line, validating newly launched TEE instances 540 may be completely halted thereby preventing the TEE instances 540 from fully starting up and performing runtime services (e.g., serving application requests). Relying solely on a private cloud adds another point of failure and may cause the application to perform poorly or even crash if the private cloud slows down or goes off-line. Conversely, system 500 advantageously allows application to scale "elastically" as long as a single instance (e.g., TEE instance 530, 540) of the application is running, and the quantity of instances can scale from one to a large quantity (e.g., unlimited) without having to contact any external validation or attestation services.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
   a memory;
   a processor in communication with the memory; and
   a first trusted execution environment ("TEE") instance configured to:
   maintain an encrypted secret that is used to launch the first TEE instance,
   obtain a cryptographic measurement associated with a second TEE instance, validate the cryptographic measurement, and
   provision the second TEE instance with the encrypted secret, wherein the first TEE instance and the second TEE instance are each configured to maintain the encrypted secret to independently validate a future TEE instance.

2. The system of claim 1, wherein the memory is encrypted memory and the encrypted secret is maintained in the encrypted memory.

3. The system of claim 1, wherein the first TEE instance is a virtual machine.

4. The system of claim 3, wherein the virtual machine is an encrypted virtual machine.

5. The system of claim 1, wherein obtaining the cryptographic measurement includes at least one of taking the cryptographic measurement or receiving the cryptographic measurement from the second TEE instance.

6. The system of claim 1, wherein the cryptographic measurement identifies characteristics of the second TEE instance including at least one of a type of the TEE instance, a version of the TEE instance, and a description of software components loaded into the TEE instance.

7. The system of claim 6, wherein the cryptographic measurement further includes an integrity code to validate the cryptographic measurement.

8. The system of claim 1, further comprising an application, the application configured to:
   launch the first TEE instance;
   send the cryptographic measurement to the first TEE instance;
   receive the encrypted secret from the first TEE instance; and
   launch the second TEE instance.

9. The system of claim 1, wherein the first TEE instance is configured to receive a request to clone the first TEE instance.

10. The system of claim 9, wherein the first TEE instance is configured to obtain a cryptographic measurement associated with a second TEE instance, validate the cryptographic measurement, and provision the encrypted secret to the second TEE instance responsive to receiving the request to clone the first TEE instance.

11. A method comprising:
    maintaining, by a first TEE instance, an encrypted secret that is used to launch the first TEE instance;
    obtaining, by the first TEE instance, a cryptographic measurement associated with a second TEE instance;
    validating, by the first TEE instance, the cryptographic measurement; and
    provisioning, by the first TEE instance, the second TEE instance with the encrypted secret, wherein the first TEE instance and the second TEE instance are each configured to maintain the encrypted secret to independently validate a future TEE instance.

12. The method of claim 11, wherein the encrypted secret is maintained in encrypted memory.

13. The method of claim 11, wherein the first TEE instance is a first encrypted virtual machine and the second TEE instance is a second encrypted virtual machine.

14. The method of claim 11, wherein the obtaining, validating, and provisioning occur responsive to receiving a request to clone the first TEE instance.

15. The method of claim 11, wherein obtaining the cryptographic measurement includes at least one of taking the cryptographic measurement or receiving the cryptographic measurement from the second TEE instance.

16. The method of claim 11, wherein the cryptographic measurement identifies characteristics of the second TEE instance including at least one of a type of the TEE instance, a version of the TEE instance, and a description of software components loaded into the TEE instance.

17. The method of claim 16, wherein the cryptographic measurement further includes an integrity code to validate the cryptographic measurement.

18. The method of claim 11, further comprising:
    launching, by an application, the first TEE instance;
    sending, by the application, the cryptographic measurement to the first TEE instance;
    receiving, by the application, the encrypted secret from the first TEE instance; and
    launching, by the application, the second TEE instance.

19. A non-transitory machine-readable medium storing code, which when executed by a processor is configured to:
    maintain an encrypted secret in a memory associated with a first TEE instance, the encrypted secret being used to launch the first TEE instance;
    obtain a cryptographic measurement associated with a second TEE instance;
    validate the cryptographic measurement; and
    provision the second TEE instance with the encrypted secret, wherein the first TEE instance and the second TEE instance are each configured to maintain the encrypted secret to independently validate a future TEE instance.

20. The non-transitory machine-readable medium of claim 17, wherein the obtaining, validating, and provisioning occur responsive to receiving a request to clone the first TEE instance.

* * * * *

UNITED STATES PATENT AND TRADEMARK OFFICE
CERTIFICATE OF CORRECTION

| | |
|---|---|
| PATENT NO. | : 11,620,411 B2 |
| APPLICATION NO. | : 16/828229 |
| DATED | : April 4, 2023 |
| INVENTOR(S) | : Michael Tsirkin |

It is certified that error appears in the above-identified patent and that said Letters Patent is hereby corrected as shown below:

In the Specification

Column 4, Line 55, replace "VIVID" with -- VMD --.

Column 4, Line 55, replace "WO" with -- VI/O --.

Column 5, Line 14, replace "VIVID" with -- VMD --.

Column 9, Line 18, replace "comprise (e.g.," with -- comprise hardware (e.g., --.

Signed and Sealed this
Eighth Day of August, 2023

Katherine Kelly Vidal
*Director of the United States Patent and Trademark Office*